USO09852823B1

(12) United States Patent
Benac

(10) Patent No.: US 9,852,823 B1
(45) Date of Patent: Dec. 26, 2017

(54) METHODS AND SYSTEMS FOR PRODUCING FISSILE MATERIAL FROM FERTILE FEEDSTOCK

(75) Inventor: John Wilson Benac, Houston, TX (US)

(73) Assignee: The Boeing Company, Chicago, IL (US)

( * ) Notice: Subject to any disclaimer, the term of this patent is extended or adjusted under 35 U.S.C. 154(b) by 977 days.

(21) Appl. No.: 12/749,688

(22) Filed: Mar. 30, 2010

(51) Int. Cl.
*G21G 1/00* (2006.01)

(52) U.S. Cl.
CPC ...................................... *G21G 1/00* (2013.01)

(58) Field of Classification Search
USPC ........................................ 376/182, 193, 190
See application file for complete search history.

(56) References Cited

U.S. PATENT DOCUMENTS

| | | | |
|---|---|---|---|
| 3,055,816 A | | 9/1962 | Paine et al. |
| 3,325,371 A | * | 6/1967 | Stanton .......................... 376/193 |
| 5,160,696 A | | 11/1992 | Bowman |
| 6,026,136 A | * | 2/2000 | Radkowsky .................. 376/173 |
| 2005/0258311 A1 | * | 11/2005 | Scott ........................... 244/172.4 |
| 2009/0000268 A1 | * | 1/2009 | Yurash ................... B64G 1/405 60/202 |

OTHER PUBLICATIONS

Fields, et al., "Reaction Products of Lunar Uranium and Cosmic Rays", Proceedings of the Lunar Science COnference, vol. 4, p. 2123, 1973.*
Dunning, "The Future of Atomic Energy", American Scientist vol. 38, No. 1, Jan. 1950.*
Bodansky, D.; Chapter 17—Nuclear Bombs, Nuclear Energy, and Terrorism; Nuclear Energy: Principles, Practices, and Prospects; Sep. 2004; pp. 481-516; Springer, New York.
Radovan, H.A., et al.; Heavy-Ion Irradiation of UBe13 Superconductors; Journal of Physics and Chemistry of Solids; Nov. 26, 2002; pp. 1015-1020; Elsevier Science Ltd.
Copeland, C.S., et al.; Neutrons by Alpha-Particle Bombarment of Light Elements; School of Chemsitry, University of Minnesota; Feb. 5, 1938; pp. 567-574; Minneapolis, MN.
The Earth's Trapped Radiation Belts; National Aeronautics and Space Administration; NASA SP-8116; NASA Space Vehicle Design Criteria (Environment); Mar. 1975; 100 pages.
Bechtel, R.; Uranium-232 Beryllide Neutron Source—A These Presented to the Faculty of the Division of Graduate Studies; Georgia Institute of Technology; May 2007; 140 pages.
Hanna, G.L. et al; preparation of the Beryllides of Uranium and Thorium; Australian Atomic Energy Commission Research Establishment Lucas Heights; Sydney Jan. 1963; 20 pages.

* cited by examiner

*Primary Examiner* — Sean P Burke
(74) *Attorney, Agent, or Firm* — DASCENZO Intellectual Property Law, P.C.

(57) ABSTRACT

A method for generating a fissile material is described. The method includes positioning a fertile, non-fissile material within outer space, the position within an area of proton or other high energy particle radiation, rather naturally or artificially occurring, allowing the high energy particle radiation to impinge the fertile but non-fissile material over a time, the time based on amount of high energy particle radiation at the position, such that the non-fissile material gradually transmutes into a fissile material due to the impingement, and deploying the fissile material within a spacecraft.

14 Claims, 4 Drawing Sheets

METHODS AND SYSTEMS FOR PRODUCING FISSILE MATERIAL FROM FERTILE FEEDSTOCK

BACKGROUND

The field of the disclosure relates generally to production of fissile material, and more specifically, to methods and systems for producing fissile material from non-radioactive feedstock.

Launching of nuclear material on space launch vehicles has generally not been implemented. One reason is due to the public concern over any possible release of nuclear materials due to a launch vehicle failure. While the risk is statistically small, the political climate is un-accepting of such a risk, and therefore, the mission enabling technology of nuclear power in space is not yet realized.

Contributing to the perceived risk is the possibility of terrorists stealing the nuclear material before launch and the costs associated with the necessary security. Another problem is the high cost of handling nuclear material and making the vehicle safe for ground handling and launch. Some spacecraft have utilized nuclear radioisotope thermoelectric generators that provide limited power, but no propulsion or high capacity power generation capabilities.

Conventional technology for generation of power and energy in space primarily includes solar cells. However, for short duration missions, chemical batteries have a sufficient useful life. One problem with solar cells and chemical batteries and other existing non-nuclear power generation systems is that they have low power densities. In short, such systems weigh more for the same energy about as compared to a nuclear powered generator.

Existing non-nuclear propulsion systems have either low specific impulse, low thrust, or both.

SUMMARY

In one aspect, a method for generating a fissile material is provided. The method includes positioning a fertile, non-fissile material within outer space, the position within an area of proton radiation, allowing the high energy particle radiation to impinge the fertile but non-fissile material over a time, the time based on amount of high energy particle radiation at the position, such that the non-fissile material gradually transmutes into a fissile material due to the proton impingement, and deploying the fissile material within a spacecraft.

In another aspect, a method for fabricating a space-based nuclear platform is provided. The method includes launching depleted uranium interspersed with a source of neutrons into outer space, positioning the depleted uranium and neutron source in outer space within an area of alpha particle flux, and allowing the alpha particle flux to impinge the source of neutrons, causing a quantity of the neutrons to impinge the uranium, transmuting the uranium into plutonium.

In still another aspect, apparatus for deployment in space is provided. The apparatus comprises a quantity of a fertile, non-fissile material, and a quantity of a neutron source, said apparatus configured for deployment within an area of alpha particle flux, such that the alpha particle flux impinges said neutron source to cause neutrons to leave said neutron source and saturate said fertile, non-fissile material such that said fertile, non-fissile material transmutes into a fissile material.

The features, functions, and advantages that have been discussed can be achieved independently in various embodiments of the present disclosure or may be combined in yet other embodiments further details of which can be seen with reference to the following description and drawings.

DETAILED DESCRIPTION

Described herein are embodiments directed to the launch of depleted uranium (or other benign yet fertile material) into the outer Van Allen Belts (or other suitable radiation environment) and bath it in radiation to produce fissile plutonium (or other nuclear fuel) for power generation or propulsion applications. One benefit to the embodiments is that the methods described utilize generally acceptable material for launch on a space vehicle and subjects it to an environment that changes the material into nuclear fuel once operatively placed in space.

In certain of the embodiments, a neutron source of a light element, such as beryllium, interacts with the high energy alpha and/or proton particles in present in radiation belts and solar winds to produce the neutrons necessary for uranium 238 to acquire and transmute into uranium 239, and further go through a series of natural reactions to eventually become plutonium 239. In certain embodiments, the neutron source is interspersed with the uranium 238, for example, in the form of the molecule UBe13. In other embodiments, the flux of high energy particles is increased by inducing a negative charge on the benign yet fertile material. In still other embodiments, a superconducting magnet is used to increase alpha particle and proton flux.

Existing non-nuclear solutions generate power for spacecraft by using solar cells or storing energy in batteries for short duration flights. Existing nuclear systems launch ready-made plutonium and are not required to be bathed in intense space radiation before going critical in a sustained reaction to generate heat. However, with the handling constraints and public opinion issues that surround nuclear devices, it is readily understood that launching of non-fissile materials is more politically acceptable that launching ready made Plutonium.

The described embodiments are different from existing breeder reactors in that the process is started using naturally occurring alpha particles or protons, rather than using artificially generated radiation to effect transmuting of fertile material becoming nuclear reactor fuel.

In use, the fuel elements that are generated as described herein are then operable as part of a modular spacecraft power system that can be affixed, after the plutonium is produced, to a user spacecraft that does not travel to the high radiation environment. Further, the produced fuel elements may be otherwise utilized as part of a spacecraft that beams power to a user spacecraft, or that beam power back to the Earth.

Figure 1:
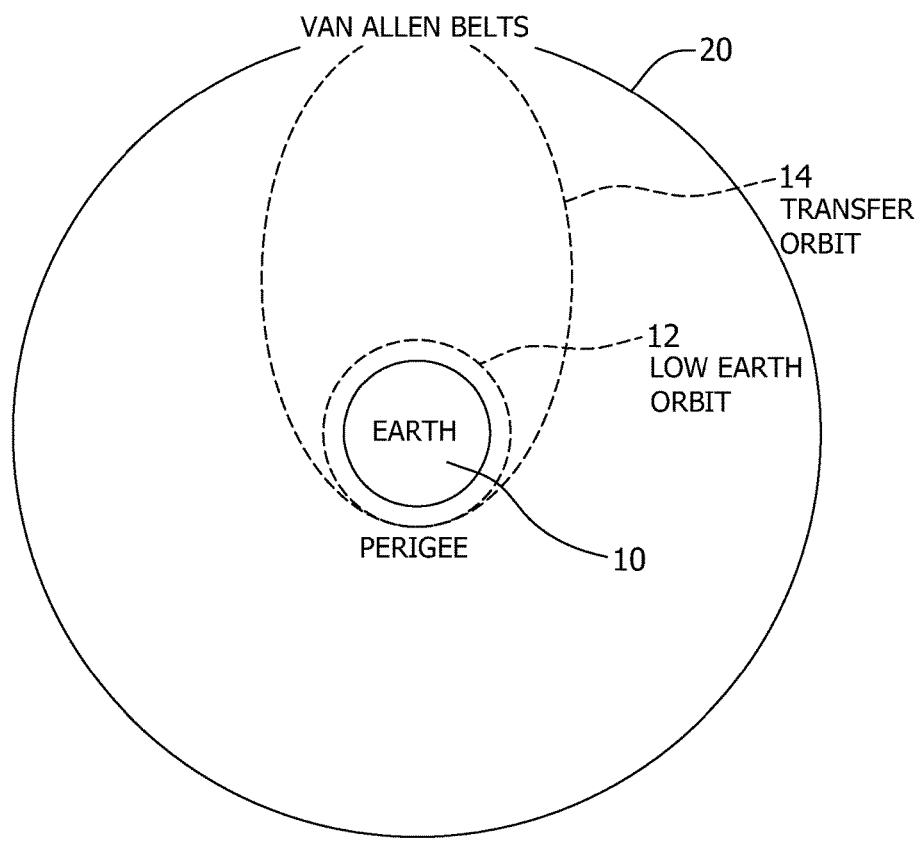
FIG. 1 is a diagram that illustrates the Earth and two of the possible orbits about the Earth, including one orbit that passes through the Van Allen radiation belts.

FIG. 1 is a diagram that illustrates the Earth 10 and two of the possible orbits 12 and 14 about the Earth 10. The low earth orbit 12 is of the type that the space shuttle, and other reconnaissance, remote sensing, and communications utilize, while the elliptical transfer orbit 14 is of the type that would enable a satellite or other spacecraft to periodically but temporarily enter the radiation areas known as the Van Allen radiation belts 20.

While oftentimes described herein as utilizing Van Allen radiation belts, it is to be understood that the embodiments are useful in other areas of space where the embodiments may be impinged by other radiation sources. As such, the embodiments may utilize naturally occurring high energy particles trapped in the Van Allen Belts to effect transmuting of otherwise non-fissile but fertile material. Alternatively, the embodiments may utilize the naturally occurring high energy particles emitted from the sun and traveling through interplanetary space as solar wind to effect transmuting of otherwise non-fissile but fertile material. Alternatively, the embodiments may utilize the naturally occurring high energy particles trapped in the Jovian (Jupiter) magnetosphere to effect transmuting of otherwise non-fissile but fertile material. Alternatively, the embodiments may utilize the naturally occurring high energy particles present in earths upper polar atmosphere at high altitudes to effect transmuting of otherwise non-fissile but fertile material. Alternatively, the embodiments may utilize the naturally occurring high energy particles emitted from the sun as solar wind and incident upon the surface of an extra-terrestrial planetary body to effect transmuting of otherwise non-fissile but fertile material in a stationary nuclear reactor.

Certain embodiments contemplate the use of artificially generated high energy particles, for example, those particles emitted from an electro-magnetic thruster on a spacecraft to effect transmuting of otherwise non-fissile but fertile material. Alternatively, the embodiments may utilize the artificially generated high energy particles emitted as part of an ion propulsion drive on a spacecraft to effect transmuting of otherwise non-fissile but fertile material. Alternatively, the embodiments may utilize the artificially generated high energy particles emitted by a particle accelerator that is similar to spacecraft electro-magnetic thruster or ion propulsion drives to effect transmuting of otherwise non-fissile but fertile material in a stationary nuclear reactor on the surface of an extra terrestrial planetary body such as earth's moon, Mars, or an asteroid.

In any of the above mentioned embodiments, high energy particle flux at a transmuting fuel rod in space may be magnified by charging that fuel rod as a cathode to attract the positively charged high energy particles.

Again, one common theme through all the described embodiments over conventional and mature space nuclear reactor technologies is that these systems can be launched safely from earth and do not require the costly and physically massive safety precautions of handling fissile material on earth and the launching of fissile material from earth.

Figure 2:
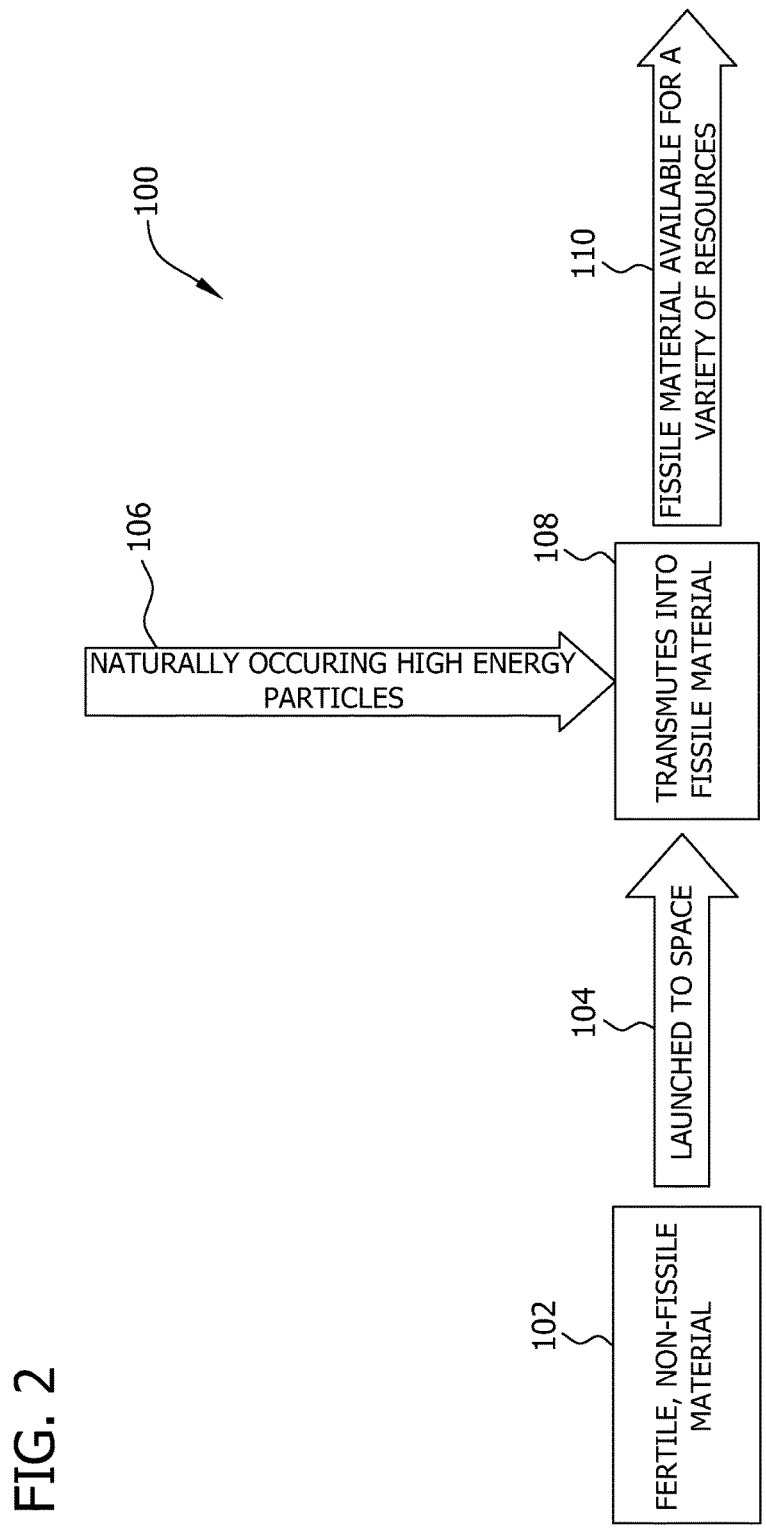
FIG. 2 is a flow diagram illustrating transmuting of a non-fissile material into a fissile material.

To that end, FIG. 2 is a flow diagram 100 illustrating transmuting of a fertile, non-fissile material 102 into a fissile material. As shown, the fertile, non-fissile material is launched 104 into space where the material is affected, directly or indirectly, by naturally occurring high energy particles 106. As described elsewhere herein, non-naturally occurring high energy particles may be utilized in certain embodiments. These particles cause the transmuting 108 of the non-fissile material into a fissile material. The fissile material is then available 110 for a variety of uses as further described herein.

Figure 3:
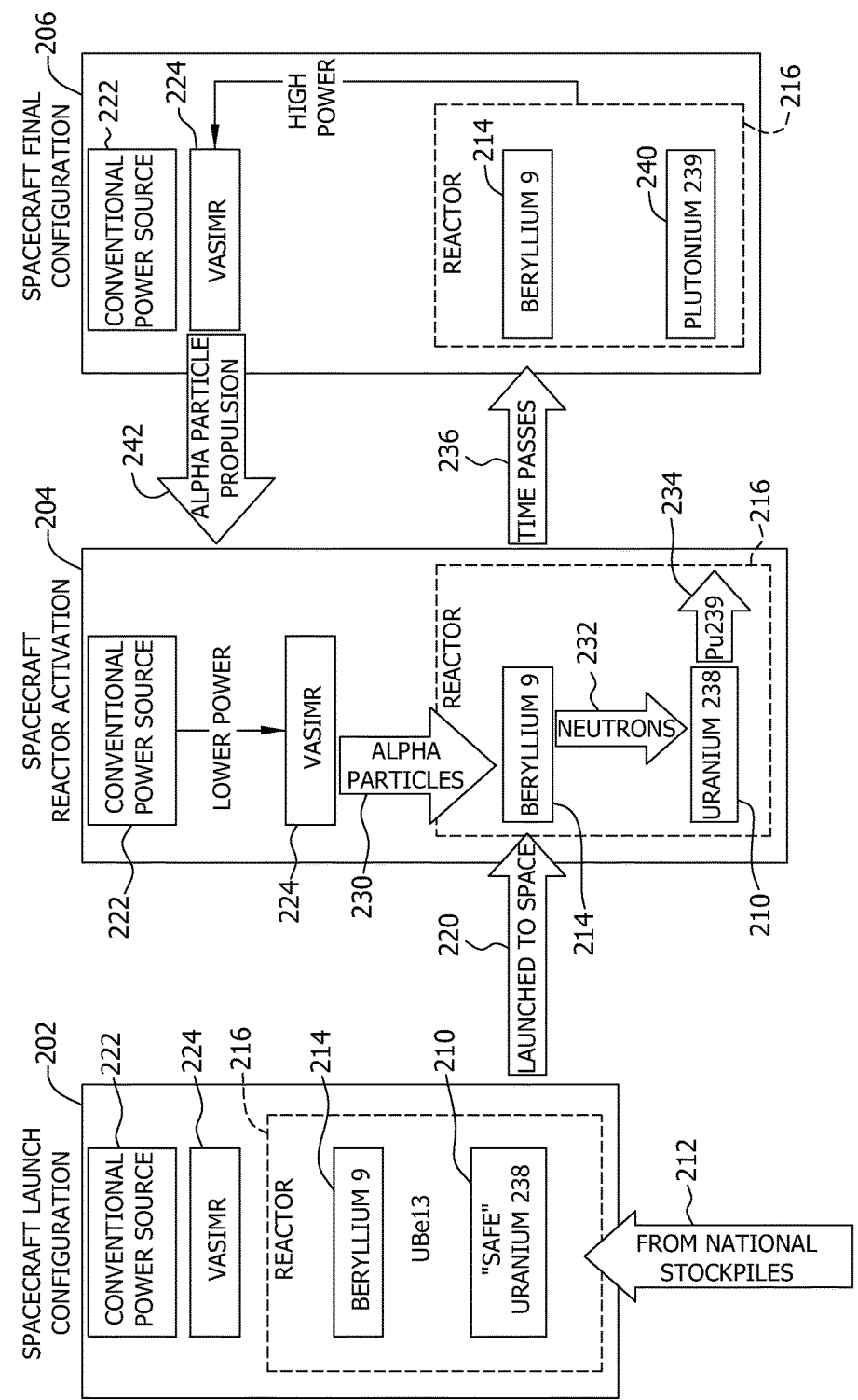
FIG. 3 is a flow diagram illustrating transmuting of uranium 238 into plutonium 239 utilizing neutrons from beryllium in terms of space craft configuration.

FIG. 3 is a flow diagram 200 illustrating a specific embodiment of the process illustrated in FIG. 2 in terms of spacecraft configuration. Specifically, FIG. 3 illustrates a spacecraft launch configuration 202, a spacecraft reactor activation configuration 204, and a spacecraft final configuration 206. As the spacecraft proceeds through these configurations, at various points of the mission, the transmuting of uranium 238 into plutonium 239 utilizing neutrons freed from beryllium due to radiation effects on the beryllium is obtained.

Referring specifically to spacecraft launch configuration 202, uranium 238 (shown as reference numeral 210) from stockpiles 212 is combined with beryllium 9 (shown as reference numeral 214) to form a compound within a reactor 216 identified as UBe13. The compound within the reactor 216 is then launched 220 into space, for example, into the Van Allen radiation belts using a conventional rocket power source 222. A Variable Specific Impulse Magnetoplasma Rocket (VASIMR) 224 is included within the spacecraft which is an electro-magnetic thruster for spacecraft propulsion. VASIMR 224 uses radio waves upon deployment to ionize and heat a propellant and magnetic fields to accelerate the resulting plasma to generate thrust.

Once the spacecraft is located in the radiation belts, the spacecraft reactor activation configuration 204 is deployed. During the time the spacecraft is in this configuration, naturally occurring alpha flux 230 (e.g., alpha particles) and/or protons will begin to impinge the Beryllium 9 214, causing neutrons 232 to be released. As the free neutrons 232 react with the uranium 238 (shown as reference numeral 210), it gradually transmutes to become plutonium 239 (shown as reference numeral 234). As time passes 236, the spacecraft achieves the spacecraft final configuration 206, where the reactor 216, now outfitted with plutonium 239 (shown as reference numeral 240) can be utilized to provide power for the VASIMR engine 224, resulting in efficient alpha particle propulsion 242 for the spacecraft.

Figure 4:
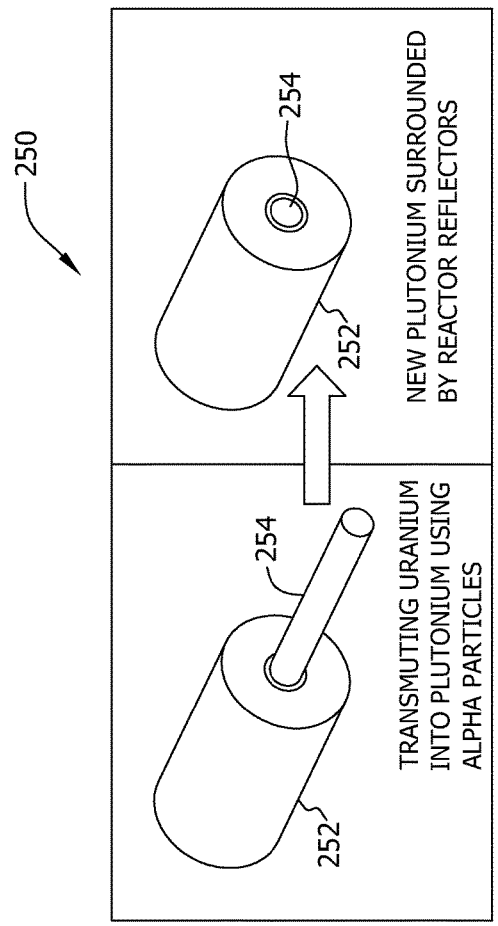
FIG. 4 is a diagram of a nuclear reaction device.

FIG. 4 is a diagram of one embodiment of a nuclear transmuting device 250 which might be found in reactor 216 (shown in FIG. 3) which includes a reactor reflector 252 and a material rod 254. As described herein, rod 254 is generally constructed of uranium 238 or a combination of uranium 238 and Beryllium 9, which is referred to herein as Ube13. Upon deployment into an area of space where radiation occurs, the rod 254 is deployed from reflector 252 so that the radiation, for example, from the Van Allen radiation belts can react with the beryllium and uranium. Upon transmuting the uranium to plutonium 239, device 250 is operable to retract the rod 254 back into the reactor reflector 252 so that device 250 achieves critical mass and may be utilized as a nuclear energy source, for example, for providing power to a VASIMR engine as described above.

As described herein, a system for space nuclear energy is provided that can avoid much of publically perceived risk of nuclear energy in space. Nuclear power in space is a mission enabling technology due to its high power densities, independence from solar flux densities, and long lifetime, compared to traditional space power and propulsion systems. Basic applications of space based nuclear power include propulsion by heating a fluid propellant, usually hydrogen, and expelling it through a nozzle, as well as generating electricity using thermoelectric or Rankine cycle mechanisms. Another application is using the created Plutonium to heat up a fluid and move the fluid to generate electricity by moving the heated fluid through a turbine. Still another application is to simply use the nuclear reaction to maintain a desired temperature within the spacecraft.

While a space nuclear power system has been previously developed and deployed in orbit (the SNAP10 system by North American Aviation's Atomics International), public sentiment has since deteriorated. Even now, press coverage often makes at least a footnote to the controversy of launching nuclear material. By launching benign material into space and processing it only once it is placed at a location where radiation, natural or artificial, operates to make the benign material fissile, much of the public concern can be avoided. Some locations in the space environment can induce production of fissile material from what was beforehand benign. One example implementation of this general concept is utilized throughout, specifically Uranium 238 feedstock.

Uranium 238 is the most abundant naturally occurring isotope of Uranium, with a half life of 4.5 billion years. Uranium 238 is separated out from Uranium 235 during Uranium enrichment, and is also known as Depleted Uranium. Eight nations of the world have an estimated cumulative 1,188,200 tons of depleted Uranium in stores (in 2001) in the form of drums of Uranium Fluoride (UF6). Although Uranium 238 is incredibly stable, when it is impacted by neutrons, it undergoes a series of subatomic reactions to become Plutonium 239, one of the three most common nuclear fuels in commercial reactors. This is the fuel cycle used in multiple breeder reactors throughout the world, as it enables using the depleted Uranium as fuel rather than having to store the depleted Uranium.

The central principal, therefore, in the proposed system for creating politically palatable nuclear power in space is to launch benign material such as Uranium 238 into space and bath it in neutrons so that it can be changed into useful material such as Plutonium 239. The high energy neutrons needed in such a process, however, are not present in the quantities desired in space. To solve this problem, another conventional technique is borrowed from commercial nuclear reactors. Neutrons often are produced initially by coupling a light element, such as Beryllium, in close proximity to a radioactive element that emits alpha particles. Because the outer Van Allen belts contain significant quantities of high energy alpha particles, Beryllium or another reactive light element orbiting in the outer Van Allen belts (or a location with similar properties) should collide with the alpha particles and transmute to a heavier element while emitting neutrons.

Beryllium, when combined with Uranium 238, should react to the environment in the radiation environment in such a way as to continuously emit neutrons into surrounding Uranium 238 to generate Plutonium 239 in place of the Uranium 238 as the Beryllium is converted to carbon and other byproducts after interaction with the alpha particles. Such a process is readily tested on the ground in any number of particle accelerators. After an appreciable amount of Plutonium 239 has been generated, but before critical mass for the fuel geometry is reached, the entire fuel assembly can be mechanically surrounded by neutron reflectors or have control rods removed, which will decrease the critical mass of the fuel element to less than the mass of the fuel element.

As the system reaches critical mass (which point in time would be controlled from the ground by actuating the reflectors or control rods) a sustained nuclear chain reaction will occur, and the fuel can be used in a myriad of applications. Such fuel could be part of a parked interplanetary stage, an orbital power generation platform, or an integrated element with a scientific probe to the outer solar system. The fuel may further be operable as a modular fuel stack for use at a manned lunar outpost, awaiting pickup from a vehicle that hasn't had to compromise its shielding levels and weight for sustained operation in the harsh radiation environment of the Van Allen Belts. Indeed, the very concept of thermoelectric power generation is an architecture within which to use the in space produced Plutonium fuel. In regard to the Van Allen belt example, placing the spacecraft which holds the uranium 238 in an elliptical orbit with perigee at three earth radii from the beginning would enable rendezvous with another spacecraft outside of the Van Allen belts by a single thruster firing to circularize the orbit of the fuel carrying spacecraft at the desired docking orbit.

A crucial parameter for the effectiveness of the Plutonium 239 production is the time required to reach a sufficient concentration of Plutonium. This is a function of the obtainable alpha particle flux through the fuel element (Uranium 238) and the efficiency of the Beryllium or other light element in producing the necessary neutrons to convert the Uranium 238 to Plutonium 239. One potential mechanism to increase the conversion rate, mentioned elsewhere herein, is to magnetically attract the naturally occurring positively charged alpha particles to increase the flux at the fuel elements using electromagnets or other device to place a negative charge on the fuel elements. UBe13, a well studied latticed molecule of Beryllium and Uranium superconducts at 0.85 Kelvin, and such a temperature is attainable through conventional liquid helium evaporation cryostats. The temperature attainable via helium evaporation is a function of evaporation rate, and can be driven down to as low as 0.3K. UBe13 also happens to be a "Heavy Fermion," with an incredibly high specific heat at low temperatures, which means such a fuel element stays colder longer after being cooled. The fuel rods destined to become Plutonium using the methods described herein can therefore also be used as the superconductors that attract the necessary alpha particles.

The effects of irradiation on UBe13 as it is superconducting have been characterized, and have been found to be moderate. Regarding neutron permeability of UBe13, studies with the Uranium 232 alpha particle emitting isotope reveal that the alpha particle induced Beryllium source neutrons are able to effectively pass through the UBe13 lattice from whence they originate. A Plutonium producing spacecraft would only have to maintain superconductivity for as long as it took to generate enough Plutonium 239 to reach critical mass when surrounded by a neutron reflector, although that reflector would not need to be moved into place until ground operators desired to activate the reactor.

Once the reaction starts, the very neutrons generated by the Plutonium 239 fission would serve to transmute more of the Uranium 238 to Plutonium 239, and the cold temperatures would be unnecessary. Beyond Beryllium, other light elements that produce neutrons when subjected to alpha particle flux include Lithium, Boron, Nitrogen, Fluorine, Sodium, Magnesium, Aluminum, Phosphorus, and Chlorine. Each of these light elements emits neutrons at different energies, and the elements are activated by alpha particles of different energies. An optimal combination reaches the highest efficiency production given the abundance and type of alpha particles in the spacecraft orbit. Beryllium is usually the most effective source of neutrons.

The alpha particles in orbit have been characterized by numerous space missions. Their flux is highest approximately three earth radii in altitude (20,000 KM.) At that point there is a 2.56 MeV alpha particle to proton ratio of 1/10. Proton flux at three earth radii is as high as $2*10^8$ protons per square centimeter per second. Therefore, natural alpha particle flux is close to $2*10^7$ particles per square centimeter per second. During a solar induced magnetic storm, alpha particle values generally increase by an order of magnitude and have been observed to remain at elevated levels for 3 months. Possibly no electromagnetism would be necessary to yield sufficient concentrations of Plutonium 239 in an acceptable timeframe.

The Alpha Magnetic Spectrometor-01 (AMS-01) instrument has demonstrated the ability of superconducting magnets to alter the trajectories of naturally occurring high energy alpha particles. AMS-02, slated for permanent installation to the International Space Station in the latter part of 2010, will further mature the techniques and understanding of naturally occurring alpha particles in space and manipulation of their trajectories.

In conclusion, launching a spacecraft containing a strong magnet, benign Uranium 238, and Beryllium to an orbit which passed through regions of intense radiation, such as found in the outer Van Allen belts affords the opportunity to harness the natural high energy alpha particles to generate Plutonium 239 and therefore nuclear energy. Such a system has safety advantages that can enable a mission that would otherwise be politically untenable, and it has been stated that space cannot be effectively explored without nuclear power and, in the longer run, nuclear propulsion. In-space Plutonium production enables the fast jump to nuclear propulsion as well as enabling nuclear power generation without the launch hazards traditionally associated with space nuclear energy.

As far as other applications of in space plutonium production, transmitting bandwidth is a function of power (kilowatts) which is a function of mass (solar array size). Any geostationary communication satellite would benefit from having a nuclear power source. A satellite with more bandwidth could be launched after being parked in the Van Allen belts for a time to activate the reactor.

Interplanetary probes traveling for years away from the sun, would benefit from nuclear reactor derived heat in the cold outer reaches of the solar system as well as the electricity generation capability of nuclear reaction where the solar flux is low. Such a system can be activated in the Van Allen belts, by the high energy particles present in the solar winds, or by the very particles that their propulsion systems emit.

Cost savings are apparent as plutonium does not have to be fabricated or purchased on Earth and regulatory issues are largely bypassed. As such, cost avoidance is achieved by lower safety factors required for ground processing and launch failure risk mitigation. In addition, insurance costs would be lower for launch vehicle that hold depleted Uranium rather than Plutonium. Costs for solar array systems would be reduced or avoided, especially for missions that are far away from the sun.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for breeding radioactive fuel stock aboard a spacecraft, located in a micro-gravity, vacuum environment, the method comprising:
    initiating an electromagnetic thruster, configured to exhaust a particle stream, comprising at least one of protons or alpha particles;
    forming a neutron source by directing a portion of the particle stream onto a target material, comprising a light element, selected from the group consisting of beryllium, lithium, boron, nitrogen, fluorine, sodium, magnesium, aluminum, phosphorus, and chlorine;
    locating a rod, comprising $^{238}$U, proximate to the neutron source;
    removing the rod from the neutron source after a fraction of $^{238}$U has been transmuted into a fraction of $^{239}$Pu; and
    locating the rod in a neutron-reflecting device, which reflects essentially all neutrons, originating from the rod, back to the rod; and
    wherein the fraction of $^{239}$Pu is defined by a minimum number of atoms necessary for criticality when the rod is located in the neutron-reflecting device.

2. The method of claim 1, wherein the target material is interspersed within the rod.

3. The method of claim 2, wherein the target material comprises beryllium.

4. The method of claim 2, wherein the rod comprises $UBe_{13}$.

5. The method of claim 4, wherein the $UBe_{13}$ contains $^{238}$U.

6. The method of claim 2, wherein forming the neutron source and locating the rod, comprising $^{238}$U, proximate to the neutron source together comprise directing the portion of the particle stream onto the rod.

7. The method of claim 1, wherein the target material comprises beryllium.

8. The method of claim 1, wherein the target material is $UBe_{13}$.

9. The method of claim 8, wherein the $UBe_{13}$ contains $^{238}$U.

10. The method of claim 1, wherein the particle stream is a stream of alpha particles.

11. The method of claim 1, wherein the electromagnetic thruster is a variable specific impulse magnetoplasma rocket.

12. The method of claim 1, wherein removing the rod from the neutron source comprises ceasing directing the portion of the particle stream onto the target material.

13. The method of claim 1, further comprising generating power with a nuclear reactor, containing the rod and the neutron-reflecting device, and directing the power to the electromagnetic thruster.

14. The method of claim 1, wherein locating the rod in the neutron-reflecting device is performed after removing the rod from the neutron source.

* * * * *